United States Patent

[11] 3,566,117

| [72] | Inventor | Maurice P. Tixier<br>Houston, Tex. |
|---|---|---|
| [21] | Appl. No. | 695,972 |
| [22] | Filed | Jan. 5, 1968 |
| [45] | Patented | Feb. 23, 1971 |
| [73] | Assignee | Schlumberger Technology Corporation<br>New York, N.Y. |

[54] MEASURING TECHNIQUE
1 Claim, 2 Drawing Figs.

[52] U.S. Cl. .................................................. 250/83.1,
250/71.5, 250/83.6
[51] Int. Cl. ....................................................... G01t 1/20,
G01v 5/00
[50] Field of Search............................................ 250/83.6
(W), 83.1, 71.5

[56] References Cited
UNITED STATES PATENTS
| 2,469,462 | 5/1949 | Russell ........................ | 250/83.6W |
| 3,321,625 | 5/1967 | Wahl............................ | 250/83.6W |
| 3,368,195 | 2/1968 | Peterson...................... | 250/83.6W |
| 3,379,882 | 4/1968 | Youmans ..................... | 250/83.6W |
| 3,435,217 | 3/1969 | Givens......................... | 250/83.6W |

Primary Examiner—Ralph G. Nilson
Assistant Examiner—Morton J. Frome
Attorneys—William R. Sherman, Richard E. Bee, Donald H. Fidler, Stewart F. Moore and John P. Sinnott ABSTRACT: A specific embodiment of the invention provides a technique for measuring the matrix composition and gas saturation of an earth formation surrounding a borehole. These parameters may be measured by combining porosity dependent signals derived from two-detector neutron porosity tool with the bulk density-related signals from a two-detector gamma-gamma mudcake compensated density tool. The combined signals produce more accurate indications of matrix lithology and gas saturation.

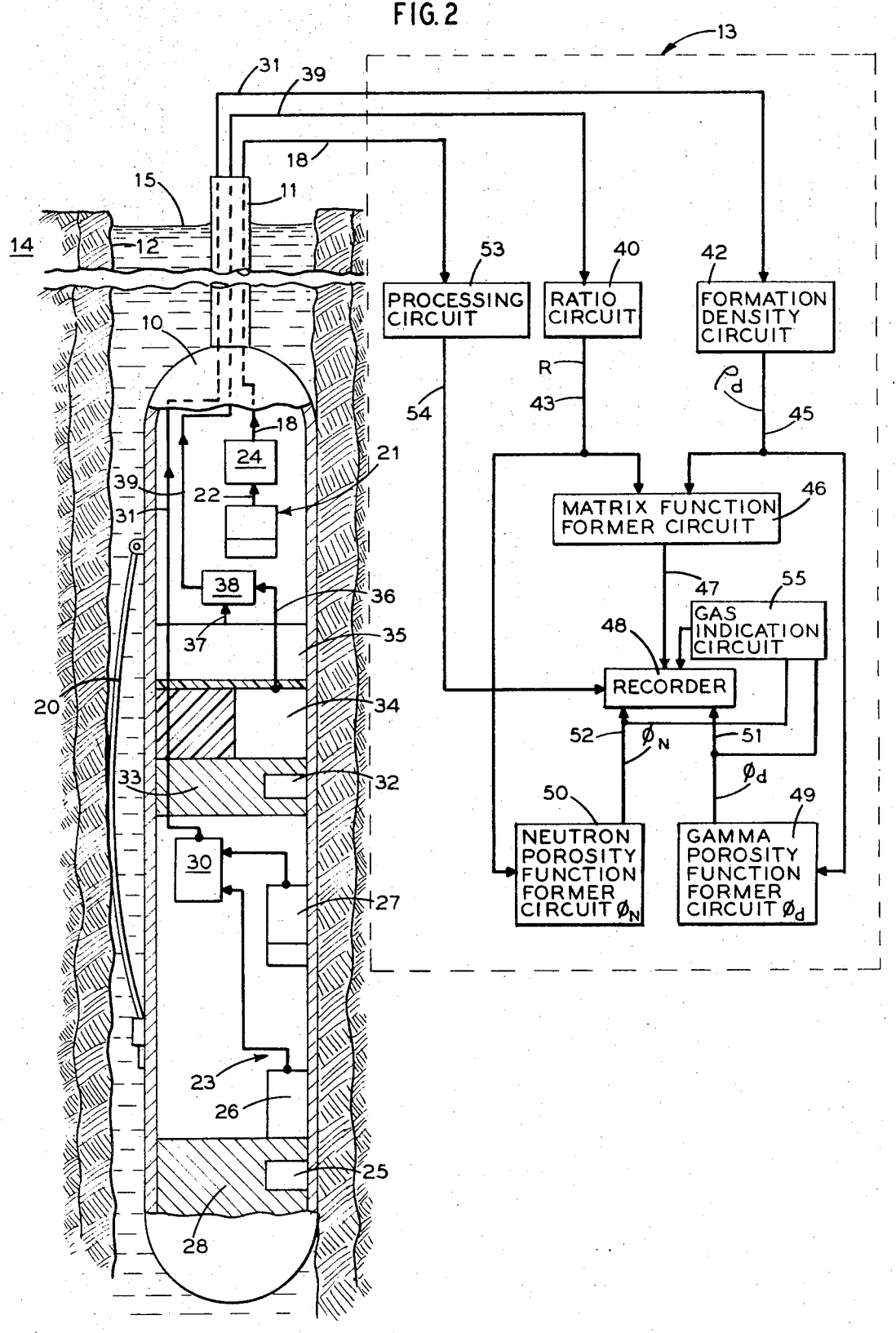

MEASURING TECHNIQUE

BACKGROUND OF THE INVENTION

1. Field of the Invention

This invention relates to borehole logging methods and apparatus, and more particularly, to radioactivity techniques for identifying the mineral composition of an earth formation, and the like.

2. Description of the Prior Art

Proposals have been advanced to identify to the presence of natural gas in an earth formation traversed by a borehole through a comparison of the apparent formation density and porosity as observed through radioactivity measuring techniques. In theory, proposals of this sort ought to produce accurate results. More subtle influences, however, as for example, the effect of the formation lithology or mineral composition on the tool response, sometimes produce logs that are ambiguous or in error.

The effect of the lithology ("matrix effect") on tools that measure the formation and porosity by observing the distribution within the rock structure of gamma rays and neutrons, respectively, can be compensated if the mineral composition is known with accuracy. As a practical matter, however, the precise nature of the rock structure seldom is known. In the usual situation, moreover, the formation under study is a mixed lithology, or a rock matrix composed of unknown fractions of two or more minerals, such as limestone and sandstone or dolomite and limestone.

In this connection, the gamma ray and neutron measurements often are in error because the gamma radiation technique is subject to imprecisely known variations in the mineral grain density and the neutron measurements are sensitive to mixed lithologies. Accordingly, to identify gas production horizons a need exists for methods and apparatus that accurately indicate the formation mineral composition in mixed lithologies. The mineral composition then provides a basis for appropriately compensating the tool response. To be satisfactory, a technique of this sort necessarily must not involve an expensive and time consuming laboratory analysis of drill cuttings or formation core samples.

Accordingly, it is an object of the invention to provide an improved technique to indicate formation mineral compositions with greater accuracy.

It is another object of the invention to contrast formation parameters derived from neutron measurements with those derived from a gamma-gamma log in order to identify the lithology of a formation with accuracy.

It is still another object of the invention to irradiate mixed lithologies with neutrons and gamma rays, and to combine the data thereby acquired to produce a more reliable indication of the proportionate mixture of those minerals that comprise the irradiated formation.

It is a further object of the invention to identify more precisely gas-bearing earth formations through a comparison of formation parameters obtained with neutron and gamma-gamma logs.

SUMMARY

In accordance with the invention, formation mineral composition and the presence of natural gas are determined in the formations traversed by a borehole through a combination of the signals acquired from a two-detector neutron porosity tool and a two-detector gamma radiation bulk density tool. This array of four detectors, moreover, substantially eliminates those sources of error that have characterized radiation measurements in formations with mixed or unknown lithologies.

More specifically, a well logging tool contains a neutron-emitting source in order to continuously irradiate a formation under study. A pair of neutron detectors spaced at different distances from the source sample the neutron population and produce signals that are related to the formation porosity. A gamma-logging device also is housed within the tool. The device comprises a source of gamma rays and two gamma radiation detectors spaced at different distances from the gamma source. The two detectors measure the attenuation of these rays in the formation under consideration.

The entire tool is urged against one side of the borehole to enable the neutron and gamma ray devices to abut the formation. Eccentering the tool in the foregoing manner further reduces inaccuracy by preventing borehole fluids from intervening between the radiation equipment and the portion of the borehole wall under investigation.

A further aspect of the invention provides a circuit on the earth's surface that produces output signals in response to the apparent neutron porosity and gamma-gamma density registered in the borehole. These output signals correspond to the formation porosity and matrix composition according to an empirically developed relationship. A logic circuit, moreover, applies a set of selection rules to these signals that indicate the presence of a gas within a formation.

The present application relates to subject matter similar to that which is described in U.S. Pat. application Ser. No. 665,575 filed on Sept. 5, 1967 by Stanley Locke for "Measuring Apparatus," and assigned to the assignee of the present invention.

For a better understanding of the present invention, together with other and further objects thereof, reference is had to the following description taken in connection with the accompanying drawings, the scope of the invention being pointed out in the appended claims.

BRIEF DESCRIPTION OF THE DRAWING

FIG. 2 is a schematic diagram of a borehole logging tool in partial section according to one embodiment of the invention, showing the electrical circuits associated therewith in block diagram form.

BRIEF DESCRIPTION OF THE PREFERRED EMBODIMENTS

Figure 1:
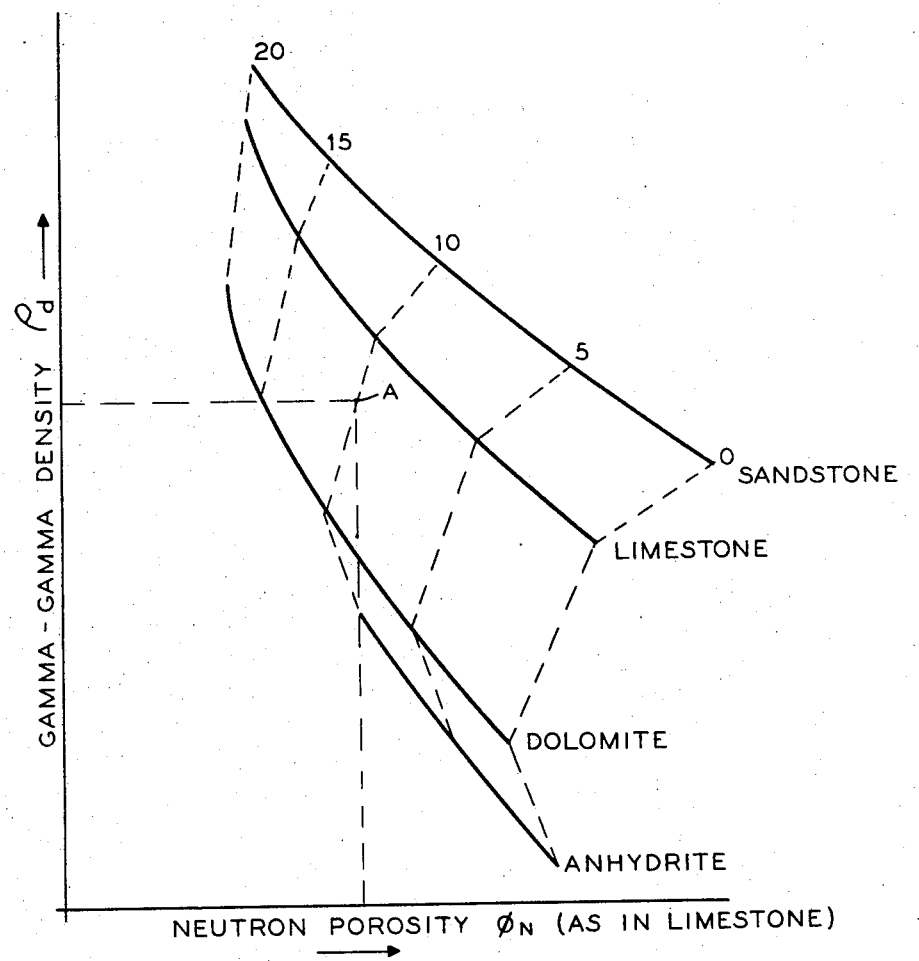
FIG. 1 is a representative graph of mineral composition in terms of apparent densities and porosities.

For more complete appreciation of the principles and advantages of the present invention, FIG. 1 shows an empirically derived graph of true formation porosity and mineral composition as a function of the apparent neutron-derived formation porosity ($\theta_n$) and the gamma radiation derived bulk density ($\rho_d$). The data shown is applicable to formations that are composed of limestone, dolomite, sandstone, anhydrite, or mixtures of limestone and sandstone, anhydrite and dolomite or dolomite and limestone.

The graph of FIG. 1 was prepared through data collected from measurements of the neutron-derived porosity and the gamma ray density values as observed in earth formations for which the true porosities and mineral composition compositions were known with accuracy. The graph enable the entering arguments $\theta_n$ and $\rho_d$ to be combined to produce a more precise indication of the formation porosity.

Illustratively, if $\theta_n$ in an unknown formation registers a specific apparent porosity and the observed value of $\rho_d$ is a particular apparent density, a unique point A is identified on a line of constant porosity of, for example, 10 porosity units. Consequently, the true formation porosity has a value of 10 units.

The point A, moreover, is spaced from the limestone curve by a separation on the 10 porosity unit line that is approximately 60 percent of the distance from the limestone curve to the dolomite curve. The relative position of the point A between the limestone and dolomite curves indicates that the formation is a mixed lithology comprised of approximately 60 percent limestone and 40 percent dolomite in the chosen illustrative example.

The presence of gas in the formation under investigation changes the neutron and gamma radiation distribution within the formation, and consequently produces a different detector response for the same mineral composition and formation porosity. This problem is overcome, in accordance with the invention, by converting the gamma radiation derived density signal into a signal that corresponds to the equivalent apparent formation porosity. This signal conversion preferably is accomplished through a circuit that executes the functional equivalent of the equation:

$$\varphi_d = \frac{\rho_g - \rho_d}{\rho_g - \rho_f}$$

where:

$\theta_d$ = gamma derived apparent formation porosity, $\rho_g$ = grain density of the formation matrix, in which the grain density of limestone is taken as a standard for calibration purposes in order to provide a common scale between the neutron- and gamma-derived porosity signal;

$\rho_d$ = bulk density of the formation as determined from the log; and $\rho_f$ = density of the fluid occupying the pore space, usually assumed to be equal to 1 gram/cc.

To determine if gas is present in the formation under investigation, $\theta_d$ is compared with the neutron-derived porosity, $\theta_n$, according to a set of predetermined selection rules. These selection rules are as follows:

$\theta_n = \theta_d$ —limestone or shaly sand;

$\theta_n > \theta_d$ —clean dolomite or shaly limestone;

$\theta_n >> \theta_d$ —shale;

$\theta_n < \theta_d$ —sandstone; and $\theta_n << \theta_d$ —gas, salt or sulfur.

Consequently, the invention satisfies an outstanding need by accurately indicating the lithology, porosity and presence of gas within the formation under consideration.

One embodiment of a practical apparatus for practicing the invention is shown in FIG. 2.

Accordingly, a fluidtight pressure resistant housing 10 is suspended by an armored cable 11 in a borehole 12. As will be described later in detail, cable 11 may comprise a group of insulated conductors that electrically connect the equipment within the housing 10 with a circuit 13 at the earth's surface. A winch (not shown) is located at the surface and is used to lower and raise the housing 10 in the borehole 12 in the customary manner to traverse earth formations 14.

The borehole 12 may be uncased and dry, or may be filled with borehole fluids 15, as shown.

To reduce the influence of the fluids 15 on the measurement of the formation 14, a decentralizing mechanism, for example a bowspring 20, is attached to the exterior of the housing 10. The bowspring 20 urges the opposite side of the housing 10 against the borehole wall to prevent the fluids 15 from intervening between the housing 10 and formation 14.

The lowermost end of the housing 10 contains a gamma ray measuring device 23. The gamma device 23 preferably may be a dual spacing formation density logging apparatus. Thus, the gamma-gamma device 23 contains a source 25 that emits gamma rays, such as cesium 137, which is adjacent to and irradiates the portion of the earth formation 14 near the side of the housing 10 that is urged against the formation 14.

The gamma rays diffusing through the earth formation 14 are detected by a short-spacing gamma ray counter 26, spaced longitudinally from the source 25 and by a long spacing gamma ray counter 27, that is separated from the source 25 by a substantially greater distance than the counter 26. The counter 26 may be a Geiger-Muller counting tube and the counter 27 may be a scintillation counter.

A Geiger-Muller counter ordinarily comprises a gas-filled cylinder with a centrally disposed electrode. Different potentials are applied to the outer cylinder and the electrode to establish a voltage gradient across the filling gas. An incident gamma ray ionizes some of the filling gas in order to produce a charge pulse in the electrode. Scintillation counters, however, are based on entirely different principles. A scintillation counter usually has a crystal that responds to incident radiation by producing a transient flash of light. A photomultiplier tube, optically coupled to the crystal, generates an electrical charge pulse that is generally proportional to the intensity of the light flash.

The source 25 is surrounded on all sides, except on the side adjacent to the borehole wall, by a lead shield 28, or the like. The shield 28 protects the gamma radiation counters 26 and 27 from direct source radiation and thereby reduces the background radiation that tends to interfere with the signals derived from the formation 14. The counters 26 and 27 also can be provided with additional shielding (not shown) to attenuate gamma radiation from all directions except that direction which is immediately in front of the individual detectors.

The theory, construction and operation of the gamma ray measuring device 23 is described more completely in "Dual Spacing Formation Density Log" by J. S. Wahl, J. Tittman, C. W. Johnstone and R. P. Alger, Journal of Petroleum Technology, Dec. 1964, pages 1411—1416; "The Physical Foundations of Formation Density Logging (Gamma-Gamma)" by J. Tittman and J. S. Wahl, Geophysics, Apr. 1965, pages 284—294; "Formation Density Log Applications in Liquid-Filled Holes" by R. P. Alger, L. L. Raymer, Jr., W. R. Hoyle and M. P. Tixier, Journal of Petroleum Technology, Mar. 1963, pages 321—332; and U.S. Pat. No. 3,321,625 granted to John S. Wahl on May 23, 1967 for "Compensated Gamma-Gamma Logging Tool Using Two Detectors of Different Sensitivities and Spacings from the Source" and assigned to the assignee of the invention described herein.

The signals from the counters 26 and 27 are transmitted through a cable 29 to a downhole processing circuit 30 in the housing 10. The circuit 30 may comprise amplifiers, discriminators and signal transmission circuits for sending the signals from the counters 26 and 27 to the earth's surface through a conductor 31 in the armored cable 11.

A neutron source 32 is placed within the housing 10 adjacent to the side that abuts the formation 14. Preferably, the source 32 is a "chemical" neutron source, for example, a mixture of plutonium and beryllium or americium and beryllium, although electrical neutron generators also are satisfactory. The source 32 emits neutrons that diffuse through the formation 14. Because the source 32 is isotropic and emits neutrons with equal probability in all directions, a copper fast neutron shield 33 is placed around most of the source 32, except, of course, the side adjacent to the borehole wall. The shield 33 thus scatters the largest possible number of neutrons toward the adjacent portion of the formation 14, and thereby enhances the statistical accuracy of the measurements in question.

A short-spaced neutron counter 34 is mounted within the housing 10 above and generally in alignment with the source 32. Typically, the neutron counter 34 may contain a helium 3 ($He^3$) filling gas at a pressure of four atmospheres within a hollow cylindrical cathode. The counter 34 also may have an anode wire (not shown) disposed within and insulated from the cathode. Neutrons scattered back to the counter 34 from the formation 14 collide with $He^3$ nuclei in the gas and initiate nuclear reactions. Each of these nuclear reactions causes some of the filling gas to ionize and produce a charge pulse in the detector output electrodes that generally is proportional to the energy of the individual reactions.

A more sensitive long-spaced neutron counter 35, that has a transverse dimension substantially coextensive with the inside diameter of the housing 10, is placed above and adjacent to the short-spaced counter 34. In this configuration, the counter 35 accommodates the largest possible volume of filling gas within the constraints imposed by a reasonable housing diameter in order to provide maximum neutron sensitivity.

Other neutron detector types can be substituted for the gas-filled counters 34 and 35; for example, helium 3 solid state neutron detectors are well suited for use in connection with the invention. Typical devices of this sort are described more completely in "Recent Improvements in Helium-3 Solid-State Neutron Spectrometry" by Thomas R. Jeter and Max C. Kennison, IEEE Transactions on Nuclear Science, Feb. 1967, Vol. NS–14, No. 1, pages 422–427.

To further increase the statistical validity of the neutron measurement, the counters 34 and 35 respond to a wide range of neutron energies. Thus, neutrons with average kinetic energies that are in thermal equilibrium with the molecular structure of the formation 14 and neutrons of higher or "epithermal" energies are registered by the counters.

Signals from the neutron counters 34 and 35 are sent through conductors 36 and 37, respectively, to a downhole signal processing circuit 38 for transmission to the earth's surface through a conductor 39 in the armored cable 11.

A "natural gamma" radiation counter 21 is spaced within the housing 10 vertically above the downhole processing circuit 38. The counter 21 responds to the naturally occurring radioactivity within the environment of the borehole 12. The counter 21 may comprise a scintillation counter assembly as hereinbefore described in connection with the counter 27. Signals from the natural gamma ray counter 21 are sent through a conductor 22 to a signal transmission circuit 24 in the housing 10. The circuit 24 preferably comprises an amplifier, a discriminator and a scaling circuit in order to prepare the signals from the counter 21 for transmission to the earth's surface through a conductor 18 in the cable 11.

As described in more complete detail in U.S. Pat. application Ser. No. 570,068 filed Aug. 3, 1966 by Stanley Locke, Harold Sherman and John S. Wahl for "Measuring Apparatus and Method" and assigned to the assignee of the invention described herein, the circuit 13 on the earth's surface includes a neutron count signal ratio circuit 40 coupled to the conductor 39. The ratio computer 40 produces signal R in an output conductor 43 that corresponds to the ratio of neutrons of all energies registered downhole by the counters 34 and 35. This signal ratio, as described in more complete detail in the aforementioned Locke et al. patent application is related to the apparent neutron-derived porosity of the formation 14.

Simultaneously, the signal from the gamma radiation density device 23 is transmitted to the surface of the earth through the cable conductor 31. This latter signal is received by a formation density circuit 42 within the circuit 13. The density circuit 42 preferably is an operational amplifier with resistor-diode feedback networks to combine the signals from the counters 26 and 27 according to a predetermined relationship that corresponds to the apparent gamma-derived density of the formation 14. The density circuit 42 responds to the signal in the conductor 31 and applies an output signal $\rho_d$ to a conductor 45.

The neutron ratio R and the density signal $\rho_d$ in the conductors 43 and 45, respectively, are coupled to a matrix function former circuit 46. The matrix circuit 46 preferably takes the form of operational amplifiers having resistor-diode networks in the individual amplifier feedback circuits. The gain adjustment provided by these feedback resistances enables the amplifiers to combine the signals applied to the conductors 43 and 45 to produce output signals that correspond to the proportionate mineral composition of the formation 14 and, in effect, exhibit an operating characteristic that simulates the graph in FIG. 1.

Typically, the mineral composition signal can be represented as a fraction of some standard voltage to indicate the relative abundance of the mineral in the formation 14 in a manner analogous to the position of the point A (FIG. 1) between the dolomite and limestone curves. The mineral composition signal is sent through a conductor 47 to a recorder 48 to produce a graph of mineral composition as a function of the borehole depth.

The neutron ratio signal, R, in the conductor 43 also is sent to a porosity function former circuit 50. The porosity circuit 50, which preferably comprises an operational amplifier and feedback resistance network arrangement of the type described in connection with the matrix circuit 46, produces an output signal that corresponds to the apparent neutron porosity, $\theta_n$, of the formation 14.

The porosity signal $\theta_n$ is applied to a conductor 52 that is connected to the recorder 48 in order to produce a graph of neutron-derived apparent formation porosity as a function of borehole depth.

The formation density signal $\rho_d$ in the conductor 45 is applied to a gamma-porosity function former circuit 49 in order to establish an output signal that corresponds to the apparent gamma-derived formation porosity $\theta_d$. The $\theta_d$ signal is coupled to the recorder 48 through an output conductor 51 to produce a graph of gamma-derived porosity as a function of borehole depth.

Visual comparison of $\theta_d$ with $\theta_n$ on the graph produced by the recorder 48 according to the selection rules hereinbefore mentioned will enable the log analyst to identify natural gas in the formation 14. Alternatively, a natural gas indication circuit 55 preferably comprising an appropriate arrangement of discriminators and gates, executes the logic functions embodied in the foregoing selection rules in response to $\theta_n$ and $\theta_d$ signals in the conductors 52 and 51, respectively. The gas indication circuit 55, moreover, transmits a signal to the recorder 48 to show the presence of a gas-bearing formation through an appropriate index mark on the margin of the graph in the recorder.

The natural gamma signal in the conductor 18 from the downhole circuit 24 is coupled to a processing circuit 53 on the earth's surface. The processing circuit amplifies and discriminates the signals from the counter 21 and applies these signals through a conductor 54 to the recorder 48. The record of natural formation radioactivity as a function of borehole depth provides formation or bed correlation and further clarifies the application of the selection rules, inasmuch as shale and other sedimentary formations usually are characterized by a higher level of natural radioactivity than other formations.

Of course, digital or a combination of digital and analogue circuit equipment also can be used in accordance with the invention to produce the results described herein.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

I claim:

1. An earth formation logging tool comprising, a housing, a gamma ray source a pair of gamma radiation detectors spaced from each other within said housing to produce signals in response to incident gamma radiation, a neutron source a pair of neutron detectors within said housing and spaced from each other and said gamma detectors for producing another signal, a third gamma ray detector within said housing for producing a signal in response to the natural formation radioactivity, and circuit means coupled to said signals for transmitting said detector signals from said housing, density circuit means for combining said gamma ray detector signals to establish a signal corresponding to the bulk density of the formation, porosity circuit means for combining said neutron detector signals to establish another signal related to the porosity of the formation, circuit means responsive to said density and porosity related signals to indicate the mineral composition of the earth formation, including circuit means responsive to said density and porosity related signals to indicate the mineral composition of the earth formation, and logic means for contrasting said density and porosity related signals to indicate the presence of gas within the formation.